United States Patent Office 3,454,361
Patented July 8, 1969

3,454,361
PROCESS FOR MANUFACTURE OF HYDRAZINE
AND ALKYL SUBSTITUTED HYDRAZINES
Ludwig Konrad Huber, King of Prussia, and Luke Ralph
Ocone, Wyndmoor, Pa., assignors to Pennsalt Chemical
Corporation, Philadelphia, Pa., a corporation of
Pennsylvania
No Drawing. Filed Feb. 9, 1966, Ser. No. 526,044
Int. Cl. C07c 109/02; C01b 1/00
U.S. Cl. 23—190                                              4 Claims

ABSTRACT OF THE DISCLOSURE

The preparation of hydrazine and lower alkyl substituted hydrazines by reaction of chlorourea and its lower alkyl derivatives with an alkaline metal hydroxide at temperatures between about 0° and 50° C. and in the presence of less than about 50% by weight of the mixture of water, removing the liquid phase and pyrolyzing the liquid-free residue.

---

The two processes now commercially used for the production of hydrazine are the Raschig process and the urea process. The Raschig process consists of the reaction of a hypochlorite with ammonia. Because the intermediate chloroamine thus formed can react with and destory hydrazine, such destruction must be minimized in the Raschig process by (1) the use of a large excess of ammonia and (2) reaction at very low concentrations. The large excess of ammonia required necessitates the use of pressure equipment to handle and recycle the ammonia. The low concentrations at which the reaction is carried out require relatively large apparatus to handle the large volumes of dilute solutions which must be processed. In addition, the most practical recovery method for the hydrazine is fractional distillation and this requires the distillation of from 40 to about 110 pounds of water for each pound of hydrazine recovered. Hydrazine distills as an azeotrope in the last fraction and the long distillation times cause decreases in overall yields because of the losses and decomposition of hydrazine during distillation. It is clear then, that the Raschig process leaves much to be desired.

The second process currently used to produce commercial hydrazine is the urea process. This process overcomes the necessity for the use of pressurized equipment by substituting urea for the ammonia used in the Raschig process. However, the urea process also requires that the reaction be carried out in dilute solutions and produces concentrations ranging from about 2.8 to 3.5% by weight hydrazine, requiring extensive concentration by distillation techniques. Since about 20 to 25 pounds of water must be distilled from the output of the urea process to obtain one pound of hydrazine, relatively large equipment, and comparatively low yields are also involved in the urea process. The amount of water needed to be removed by distillation to obtain one pound of hydrazine is referred to as "ballast" and it is obvious that low ballast processes are desirable.

The reaction of chlorourea with sodium hydroxide in dilute aqueous solutions to yield hydrazine has been disclosed by Chalsty and Israelstam (J. South African Chemical Institute, vol. IX, No. 1, pp. 37–38 (1956)). In the process disclosed, however, the hydrazine product is obtained in very dilute aqueous solution (e.g. less than 1%) and the problems of separation to a concentrated hydrazine solution still exist.

The present invention permits the direct preparation of essentially anhydrous or highly concentrated aqueous solutions of hydrazine and alkyl substituted hydrazines, in simple non-pressurized apparatus, by reacting a heterogeneous mixture of one mole of a chlorourea of structure $R_1NHCONR_2Cl$, where $R_1$ and $R_2$ are selected from the group consisting of hydrogen and lower alkyl, with more than two moles of an alkali metal hydroxide at a temperature between about 0° and 50° C., and in the presence of less than about 50% by weight of the mixture of water, separating the reaction fluids (by distillation, filtration, centrifugation, etc.) and thereafter isolating the hydrazine product from the residue by subjecting it to pyrolysis.

In carrying out the process, sufficient liquid is preferably used to facilitate the reaction of the chlorourea and caustic, but the process may be run under even almost dry conditions. In any event, the process will be operated under conditions such that the reactants will not be entirely in solution, but will form a workable slurry either in water or in solvents inert to the reaction such as alcohols, preferably lower aliphatic alcohols, amides, e.g., dimethylformamide, dimethylacetamide, etc., aromatic hydrocarbons, e.g. benzene, toluene, etc., ethers and numerous other solvents usually used in organic syntheses.

The present invention permits the preparation of hydrazine in very high concentration and the hydrazine product may be separated by distillation of very much lower amounts of water than are required by the Raschig and urea process now commercially used. For example, the prior art processes require that from about 20 pounds (urea process) to 110 pounds of water (Raschig process) be distilled to obtain one pound of hydrazine, whereas the present invention produces hydrazine solutions which require distillation of only from about 3 to 12 pounds of water per pound of hydrazine. If desired, the greater part of this ballast water can be removed also by filtration, centrifugation, extraction etc.

The hydrazines which may be prepared in accord with the invention will be compounds of structure $R_1NH$—$NHR_2$ where $R_1$ and $R_2$ are selected from the group consisting of hydrogen and lower alkyl, as for example methyl, ethyl, n-propyl, isopropyl, isobutyl, t-butyl, and the like. Thus, specific compounds that will be made by this process will include hydrazine, N-methylhydrazine, N,N'-dimethylhydrazine, N-ethylhydrazine, n-propylhydrazine, N,N'-dibutylhydrazine, N-methyl-N'-ethylhydrazine, and the like.

The process details will be discussed below in terms of hydrazine, but it will be understood that these details apply to the above defined hydrazine derivatives as well. Chlorourea and its derivatives may be prepared by conventional methods, e.g. by chlorination of an aqueous solution of urea or N-alkylurea, or by reaction of urea with tertiary butylhypochlorite in an anhydrous system. The chlorourea obtained is stable enough to be handled and stored safely. Chlorourea may also be used in form of 1:1:1 urea:chlorine:HCl acceptor reaction mixtures, i.e. without isolation of the free chlorourea.

The chlorourea, preferably in dry form or as a concentrated aqueous solution is gradually added to a substantial stoichiometric excess of NaOH at from 0 to about 50° C. with agitation. The NaOH may be used in dry form, as an aqueous dispersion or slurry, or as a slurry in inert solvents such as referred to above. The amount of caustic used will be such that the amount of water present is less than about 50° by weight of the total weight of the reactants, and preferably, the amounts of reactants used will be such that the water present is less than about 25° by weight. All that is necessary in operating the process successfully is that enough liquid phase be present (either water or inert solvent) to provide good contact between the reactants while stirring.

In most cases the base will preferably be present in amounts of from 2.5 and most preferably from 3.5 to about 6 moles of base per mole of chlorourea. After the chlorourea has been completely added, the reaction mixture is agitated and the reaction mixture is subsequently freed essentially of water or other liquid so that no liquid phase is present.

It will be understood that the residue, although appearing dry, will contain solvent in absorbed form, due to the presence of caustic which has strong sorptive powers. When the preferred solvent, water, is used in the process the "dry" residue will actually contain significant amounts of water of hydration and thus when the residue is pyrolyzed, hydrazine will be obtained as the hydrate or as an aqueous solution if more than one mole of free water is present in the reaction mixture for each mole of hydrazine. On the other hand, by carefully removing the water of hydration from the residue at sufficiently low temperatures an essentially anhydrous product may be obtained directly.

In the pyrolysis step, the residue is merely heated to liberate the hydrazine. The temperature for the pyrolysis will vary somewhat with the particular hydrazine derivative being evolved, but in general will be above about 150° C. and in the case of hydrazine will be above about 170° C. Pyrolysis at temperatures between about 150° to about 350° C. will generally be satisfactory for the process.

As in most hydrazine-producing reactions, it is desirable, in aqueous systems, to add a small amount of gelatin or animal glue in order to enhance the yields of product obtained. The exact function of this gelatin is not understood, but there appears to be some chelating effect which may serve to remove ions capable of causing decomposition of hydrazine from the reaction mixture.

The following examples will serve to illustrate the invention in more detail.

EXAMPLE 1

To a mixture of 35.5 g. NaOH (0.88 mole), 17 g. $H_2O$ and 1 g. gelatin (corresponding to a 67° solution of NaOH), 22.7 g. chlorourea (0.24 mole) were added in small portions while the reaction mixture was held at 10–25° C. and stirred rapidly. The water content of the mixture was 22.3% based on the water added. After the addition was completed, the reaction mixture was stirred for 30 minutes at room temperature and then heated under vacuum (0.3 mm.) to 100° C. whereby the liquid phase was removed to yield 24 g. of colorless hydrazine-free liquid (water). A sample of the dry, colorless residue was shown by titration to release 84.1% hydrazine in acidic solution and thus the water ballast was 3.7 pound of water per pound of hydrazine. Then, 1.5 g. of the dried reaction mixture was pyrolyzed under a slow stream of nitrogen at 160–170° C., and evolution of a colorless liquid took place. On gradual further heating to 255° C. for 2½ hours, a total of 0.2 g. distillate was collected which by its infrared spectrum was identified as hydrazine. Titration as above showed that the sample contained 72.6% $N_2H_4$ (balance essentially all water) corresponding to an 81% recovery.

Another portion of the reaction mixture was further dried under 0.2 mm. pressure and 145–155° C. for 1¾ hours. Then, 6.635 g. of this sample were subsequently heated under a slow stream of $N_2$ whereby the temperature was gradually raised to 360° C. within 2¼ hours. The distillate amounted to 0.618 g. and was identified as hydrazine (infrared spectrum). The sample contained 95.2% $N_2H_4$ corresponding to a 71.2% recovery. The residue of the dry distillation had a $N_2H_4$ content of 1.44% corresponding to 10% of original. This hydrazine would have been removed by extended dry distillation.

EXAMPLE 2

To a solution of 12 g. of urea (0.2 m) in 7 ml. $H_2O$, 10.6 g. of anhydrous sodium carbonate was added in small portions. At the same time, a stream of chlorine was introduced into the slurry, which was cooled in ice and stirred mechanically. Within 2 hours, 13 g. of chlorine (0.18 m.) were absorbed, while some gas (presumably $CO_2$ and possibly some $N_2$) were evolved. The reaction mixture contained 20.9% available chlorine indicating 68.5% conversion to chlorourea. Then 35 g. of the ice-cold reaction mixture were added to a stirred mixture of 16 g. NaOH (0.4 m.), 0.5 g. gelatin and 8 g. $H_2O$. At the end of the addition (1½ hrs.) the reaction mixture showed very little oxidizing power, and this residual oxidizing power completely disappeared on subsequent stirring at room temperature. The $H_2O$ concentration of the reaction mixture at this point corresponded to about 23% (exclusive of any water of reaction). Then, 60 ml. ethanol were added to the creamy reaction mixture, and the solid was filtered and washed with 20 ml. ethanol to yield 24 g. colorless solid. When the above solid was subjected to pyrolysis at 175°–200° C. an aqueous solution of about 75% by weight hydrazine was obtained.

EXAMPLE 3

When 1 mole of chloromethylurea and 6 moles of sodium hydroxide are reacted as in Example 1 and the dry residue pyrolyzed to 200° C. a concentrated aqueous solution of N-methylhydrazine is obtained in good yield.

EXAMPLE 4

When 1 mole of $CH_3NHCONCH_3Cl$ and 6 moles of sodium hydroxide are reacted as in Example 1, decomposition of the residue by pyrolysis yields a concentrated aqueous solution of N,N'-dimethylhydrazine.

A unique advantage of the process of the invention which is demonstrated in the above examples, is that it makes possible direct synthesis of unsymmetrical hydrazines characterized by the structural formulae $$H_2N—NHR_1$$

and 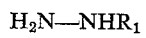 where $R_1$ and $R_2$ are lower alkyl as set forth above. Although this type of hydrazine may be made by the Raschig process by using appropriate mixtures of amines and ammonia, the product of the reaction is a mixture of all of the possible combinations. Thus, in the Raschig process, $CH_3NH_2$ and $NH_3$ yield $H_2N—NH_2$, $H_2N—NHCH_3$, and $CH_3NH—NHCH_3$. In the process of this invention, however, the desired unsymmetrical hydrazine may be made essentially free of unwanted by-products.

In addition, the process of the invention permits low reaction volumes to be used which, in turn, means that smaller, less expensive equipment may be used in the construction of commercial plants. The low volume of liquids to be separated from the reaction product also means a more efficient, more economical process in terms of both equipment and time. The process contributes further to reduced reaction times by virtue of the relatively high rates of reaction inherent in it. Furthermore, the yields of product produced are high. Finally the process can be operated in such a way that hydrazine is directly obtained in essentially anhydrous form. This is a unique feature which cannot be achieved by the processes technically now in use.

We claim:

1. A process for preparing hydrazine and alkyl substituted hydrazines, which comprises reacting a slurry of one mole of a chlorourea of structure $R_1NHCONR_2Cl$ where $R_1$ and $R_2$ are selected from the group consisting of hydrogen and lower alkyl with more than two moles of an alkali metal hydroxide at a temperature between about 0° and 50° C., and in the presence of less than about 50% by weight of the mixture of water, removing the liquid phase from the reaction mass and thereafter obtaining the hydrazine product by pyrolyzing the liquid-free residue.

2. A process as in claim 1 where $R_1$ and $R_2$ are hydrogen.

3. A process as in claim 1 where $R_1$ is hydrogen and $R_2$ is methyl.

4. A process as in claim 1 where $R_1$ and $R_2$ are methyl.

References Cited

Chalsty et al.: Chem. Ab., vol. 51, 1957, p. 1117d.

CHARLES B. PARKER, *Primary Examiner.*

P. C. IVES, *Assistant Examiner.*

U.S. Cl. X.R.

260—555, 583